United States Patent [19]

Witman

[11] Patent Number: 4,581,397
[45] Date of Patent: Apr. 8, 1986

[54] STABILIZED POLYCARBONATE COMPOSITION

[75] Inventor: Mark W. Witman, Krefeld, Fed. Rep. of Germany

[73] Assignee: Mobay Corporation, Pittsburgh, Pa.

[21] Appl. No.: 537,203

[22] Filed: Sep. 29, 1983

[51] Int. Cl.$^4$ .............................................. C08K 5/34
[52] U.S. Cl. .................. 524/101; 524/504; 524/539
[58] Field of Search ............... 524/101, 504, 539, 542; 525/63, 64, 68, 291, 405, 406, 414, 427

[56] References Cited

U.S. PATENT DOCUMENTS

| 3,678,047 | 7/1972 | Kletecka et al. | 260/248 |
|---|---|---|---|
| 4,245,058 | 1/1981 | Liu | 525/148 |
| 4,251,647 | 2/1981 | Liu | 525/91 |
| 4,299,928 | 11/1981 | Witman | 525/67 |

FOREIGN PATENT DOCUMENTS 1348093  3/1974  United Kingdom .

*Primary Examiner*—Harold D. Anderson
*Assistant Examiner*—Kriellion Morgan
*Attorney, Agent, or Firm*—Gene Harsh; Lawrence S. Pope; Aron Preis

[57] ABSTRACT

A molding composition comprising a polycarbonate resin and an impact modifier containing an acrylate or a methacrylate functionality is imparted improved processability and freedom from splay upon the admixing of a certain stabilizer therewith.

9 Claims, No Drawings

STABILIZED POLYCARBONATE COMPOSITION

FIELD OF THE INVENTION

The present invention relates to polycarbonate molding compositions and more particularly to impact modified polycarbonate molding compositions.

BACKGROUND OF THE INVENTION

It is known that polycarbonates exhibit high notched Izod (ASTM test D-256) impact values. These values, about 16 ft-lbs/in., associated with failure in a ductile mode, are characteristic of test specimens about one-eighth inch or thinner. Thicker specimens, i.e. one-fourth inch, fail in a brittle fashion at about 2.5 ft-lbs/in.

Impact strength dependence on thickness gives rise to "critical thickness", a material parameter defined as that thickness at which a discontinuity occurs in the graphical representation of impact strength vs. specimen thickness. For example, polycarbonate based on bisphenol A, having a melt flow rate of 3 to 6 grams/10 minutes at 300° C. (ASTM D 1238) exhibits a discontinuity at about 5.71 mm (225 mils). Articles of this material thinner than 225 mils will show ductile failure upon impact while thicker ones will fail in a brittle fashion.

This dependence of impact performance on thickness represents a drawback because it tends to limit the utility of polycarbonates by imposing restrictions on the design of molded articles.

The art is noted to disclose various means for improving the impact performance of polycarbonate resins; noted are U.S. Pat. Nos. 4,245,058, 4,251,647 and 4,299,928. It has been the experience of workers in the field that molding compositions containing impact modifiers containing an acrylic or a methacrylic functionality exhibit an undesirable degree of splay— also known as silver streaking—upon injection molding at high temperatures. U.S. Pat. No. 3,678,047 is noted to disclose the stabilizer of the present invention.

SUMMARY OF THE INVENTION

A molding composition comprising a polycarbonate resin and an impact modifier containing an acrylate or a methacrylate functionality is imparted improved processability and freedom from splay upon the admixing of a certain stabilizer therewith.

DETAILED DESCRIPTION OF THE INVENTION

When used herein, the term "polycarbonate resins" means the neat resin without additives; "polycarbonate" means the polycarbonate resin with additives incorporated therein. The polycarbonate resins of the invention may be prepared by conventional methods of preparation for polycarbonate resins and are characterized in that their weight average molecular weight is between about 10,000 and 200,000 preferably 20,000 to 80,000; they are alternatively characterized in that their melt flow rate is between about 1 and 24, more preferably 2-18 grams/10 minutes at 300° C. (ASTM D-1238).

Any suitable processes, reactants, catalysts, solvent conditions and the like for the production of polycarbonate resins which are customarily employed in the synthesis of polycarbonate resins may be used in the preparation of the polycarbonate of the invention. Such are disclosed in German Pat. Nos. 1,046,311 and 962,274 and U.S. Pat. Nos. 3,248,414; 3,153,008; 3,215,668; 3,187,065; 3,028,365; 2,999,846; 2,964,974; 2,970,137; 2,991,273 and 2,999,835, all incorporated herein by reference.

Essentially the processes for the preparation of polycarbonate resins entails a reaction between a dihydroxy compound and a carbonate precursor.

In the present context, dihydroxy compounds suitable for the preparation of the polycarbonates of the invention conform to the structural formula (1) or (2)

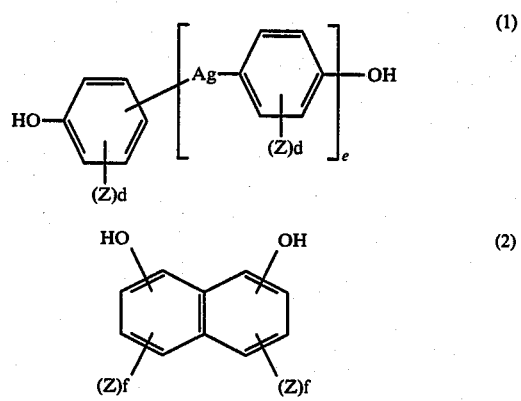

wherein

A denotes an alkylene group with 1 to 8 carbon atoms, an alkylidene group with 2 to 8 carbon atoms, a cycloalkylene group with 5 to 15 carbon atoms, a carbonyl group, an oxygen atom, a sulfur atom, an —SO— or —SO$_2$— radical; a radical of the general formula:

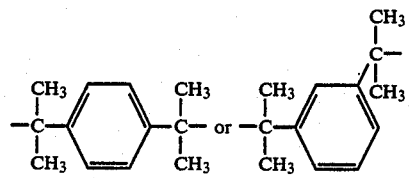

g denotes the number 0 or 1; d denotes 0 to 4;
e denotes the number 0 or 1;
Z denotes F, Cl, Br or C$_1$-C$_4$-alkyl and if several Z radicals are substituents in one aryl radical, they may be identical or different; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl benzene, 4,4'-sulfonyl diphenol.

Examples of particularly preferred dihydroxy compounds are bisphenols such as 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable dihydroxy compounds.

The aromatic polycarbonate resins of the invention may be branched by incorporating small amounts, i.e., between 0.05 and 2.0 mol percent (relative to the amount of diphenols) of compounds having a functionality of three or more in particular those with three or more phenolic hydroxyl groups.

Polycarbonates of this type are described, for example in DOS (German published specifications) Nos. 1,570,533; 1,595,762; 2,116,974; 2,113,347 and 2,500,092, in British Patent Specification No. 1,079,821 and in U.S. Pat. No. 3,511,514.

Examples of some of the compounds which have three or more phenolic hydroxyl groups and which may be used are phloroglucinol, 4,4-dimethyl-2,4,6-tri-(4-hydroxyphenyl)-hept-2-ane, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)]-cyclohexylpropane, 2,4-bis(4-hydroxyphenylisopropyl)-phenyl-2,6-bis-(2-hydroxy-5'-methylbenzyl)-4-methylphenol, 2-(4-hydroxyphenyl)-2-(2,4-dihydroxyphenyl)-propane and 1,4-bis-(4,4''-dihydroxytriphenylmethyl)-benzene. Other suitable trifunctional compounds are 2,4-dihydroxybenzoic acid, trimesic acid, cyanuric chloride, 3,3-bis-(4-hydroxyphenyl)-2-oxo-2,3-dihydroindole and 3,3-bis-(3-methyl-4-hydroxyphenyl)-2-oxo-2,3-dihydroindole-3,3-bis-(3-methyl-4-hydroxyphenyl)-2-oxo-2,3-dihydroindole.

Further suitable in the context of the invention are phenolphthalein-based polycarbonate resins, including copolycarbonates and terpolycarbonates such as are described in U.S. Pat. Nos. 3,036,036; 3,035,021; 3,036,037; 3,036,038; 3,036,039 and 4,210,741, all incorporated herein by reference.

The impact modifier suitable in the present invention is a rubber which in the present context is defined as any polymeric material having a glass transition temperature below 20° C. and which is characterized in that it contains an acrylate or a methacrylate functionality.

Among the suitable acrylate containing rubber modifiers are ethylene acrylate and propylene acrylate copolymers as well as acrylonitrile-styrene-acrylate (ASA) terpolymers. Further suitable acrylate rubbers are graft rubbers which can be made following known procedures and which are available from a number of sources, e.g. Rohm & Haas Company, Philadelphia, United States under the trade designations Acryloid KM 330, Acryloid KM 323B and 7709XP. Other useful polyacrylates are available from Goodyear Tire & Rubber Company, Akron, Ohio, United States under the trade designation RXL6886; from American Cyanamid Company, Stamford, Conn., United States, under the trade designation Cyanacryl 770; from M & T Chemicals Company, Trenton, N.J., United States, under the trade designation Durastrength 200; and from Polysar Corporation, Canada, under the trade designation Polysar S1006. In general, any of the polyalkyl acrylates described in U.S. Pat. No. 3,591,659, incorporated by reference herein, can be used, especially those containing units derived from n-butyl acrylate. Preferably, the polyacrylate resin will be in the form of a rubber-elastic graft copolymer having a glass transition temperature below 20° C. as described in Schlichting et al, U.S. Pat. No. 4,022,748, incorporated by reference herein. Especially preferably, the polyacrylate will comprise a multiple stage polymer having a rubbery first stage and a thermoplastic hard final stage, as described in U.S. Pat. Nos. 4,096,202 and 3,808,180, both incorporated herein by reference. Briefly, the technology described in U.S. Pat. No. 4,096,202 is that of the preparation of a specific class of multiphase compounds. These are compositions comprising about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylic rubber core having a glass transition temperature below about 10° C. which is crosslinked with 0.1 to 5 percent by weight of a crosslinking monomer and to which is added 0.1 to 5 percent by weight of a graftlinking monomer.

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and consequently at or near the surface of the elastomer particles. The preferred graftlinking monomer is diallyl maleate.

The final stage monomer system can be comprised of alkyl methacrylate (preferably $C_1$-$C_{16}$ methacrylate), styrene, acrylonitrile, alkyl acrylates, dialkyl methacrylate, and the like, as long as its Tg is at least 20° C. Preferably, the final stage monomer system is at least 50 weight percent $C_1$ to $C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl acrylate and in that its crosslinking agent is 1,3-butylene diarylate and in which the graftlinking agent is diallyl maleate and the second phase monomeric system of which is methyl methacrylate, said components relating by weight to 79.2/0.4/0.4/20.0, is available from Rohm & Haas Corporation as Acryloid KM 330.

Among the rubbers containing a methacrylate functionality suitable in the present context are methacrylate-butadiene-styrene terpolymers such as Acryloid KM-653, characterized in that it contains a butadiene core (77.5%) (bd/styrene/methylmethacrylate/divinylbenzene=95/4/4/1) onto which grafted is styrene (11.03%)/methylmethacrylate (11.48%) and 0.12% of 1-3 butylene diacrylate available commercially from Rohm & Haas.

The family of stabilizing compounds suitable in the context of the present invention is described in U.S. Pat. No. 3,678,047, incorporated herein by reference. Essentially, the stabilizer in the present context is a compound conforming to the structural formula (I)

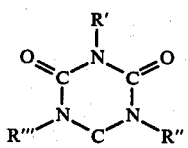

wherein R' is an alkylhydroxyphenyl carboalkoxy group having the formula

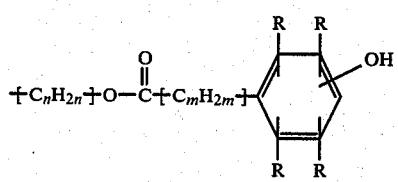

wherein n is an integer of from 1 to 12 and wherein m denotes an integer of from 0 to 8, R is a hydrogen atom or a $C_1$-$C_{12}$ hydrocarbon radical, R" and R''' are the same as R' or are a hydrogen atom or a $C_1$-$C_{20}$ hydrocarbon radical such as alkyl, cycloalkyl, aryl, alkaryl or a $C_1$-$C_{12}$ aralkyl, or hydroxyalkyl or a $C_2$-$C_{20}$ alkylcarboalkoxy group, preferably R" and R''' are identical to R' above. Most preferably, R' conforms to

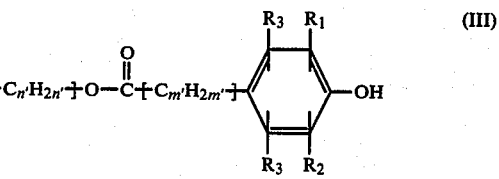

wherein n' is an integer of from 1 to 8, m' is an integer of from 1 to 4, $R_1$ is a $C_1$-$C_8$ alkyl radical and $R_2$ and $R_3$ are hydrogen or a $C_1$-$C_8$ alkyl radical. More preferably, $R_1$ is a $C_4$-$C_8$ tertiary alkyl group, $R_2$ is a $C_1$-$C_8$ alkyl group and $R_3$ is a hydrogen atom.

An especially preferred class of suitable compounds in the present context and those wherein R', R", and R''' in (I) above are alkyl-hydroxyphenyl carboalkoxy groups of formula (III) wherein n' is an integer of from 1 to 3, m' is an integer of from 1 to 3, $R_1$ and $R_2$ are $C_1$-$C_4$ tertiary alkyl groups and $R_3$ is hydrogen.

The compound used in the course of demonstrating the invention in the examples that follow is termed 3,5-di-tert.-butyl-hydroxyhydrocinnamic acid triester with 1,3,5-tris-(2-hydroxyethyl)-s-triazine-2,4,6(1H, 3H, 5H)-trione and is available in commerce as Goodrite 3125 antioxidant from B. F. Goodrich Chemical Company, of Cleveland, Ohio.

The structure of Goodrite 3125 is considered to conform to

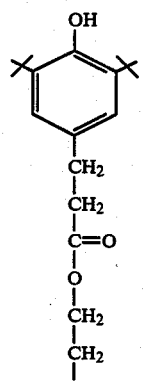

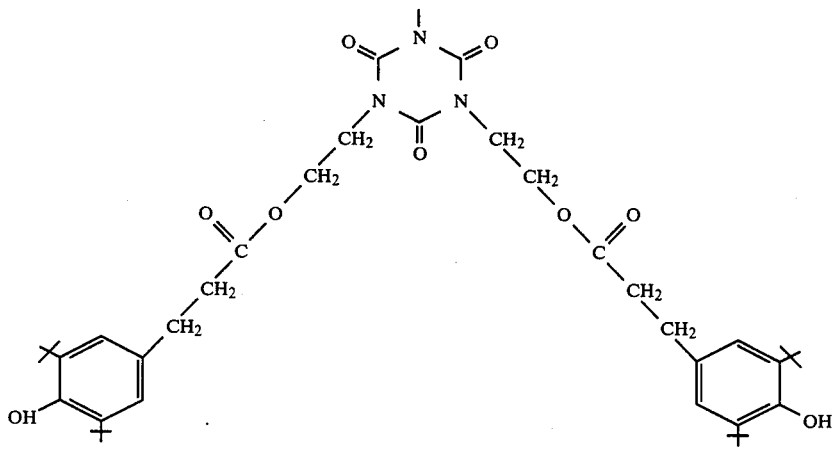

In the practice of the invention, molding compositions comprising a polycarbonate resin and an effective amount of impact modifier of the type described above are rendered improved processability by the admixing therewith a stabilizer in an amount sufficient to substantially eliminate splay. Preferably, the composition comprises a blend containing about 80 to 99 percent of a polycarbonate resin and about 1 to 20 percent of an impact modifier, said percentages being relative to the weight of the blend, and about 0.05 to about 0.5 phr, preferably about 0.1 to about 0.3 phr of the stabilizer above, said phr being in relation to the weight of said blend.

The compositions of the invention may be prepared by mechanical blending using conventional techniques, the aromatic polycarbonate with the impact modifier and stabilizer. The manner of making the compositions of the invention and its use will be further appreciated upon the consideration of the examples set forth below.

The incorporation in the compositions of the invention of flame retardants, mold release agents, UV and hydrolytic stabilizers as well as fillers and reinforcing agents is included in the scope of the present invention.

The invention will be illustrated but is not intended to be limited by the following examples.

EXAMPLES

Example 1

Compositions containing a polycarbonate resin and rubber modifier were stabilized in accordance with the invention and compared to compositions employing as stabilizer compounds having largely similar structures. The compositions of the invention are characterized in that they exhibit no splay. In the preparation of the composition below the additives are described as follows:

Irganox 1010—tetrakis[methylene(3,5-di-tert-butyl-4-hydroxyhydrocinnnamate)]methane—and Irganox 1076 (octadecyl-3,5-di-tert-4-hydroxyhydrocinnamate) are high molecular weight antioxidants available from Ciba-Geigy, both being characterized in that they contain sterically hindered phenol groups.

Cyanox 1790—1,3,5-tris(4-tert-butyl-3-hydroxy-2,6-dimethylbenzyl)-1,3,5-triazine-2,4,6-(1H,3H,5H)-trione—is a hindered phenolic primary-type antioxidant, a product of American Cyanamid Company.

Goodrite 3114 is an antioxidant: tris-(3,5-di-5-butyl-4-hydroxybenzyl)isocyanurate available from B. F. Goodrich Chemical Co.

The compositions were compounded in a 1½″ extruder (2.75:1 screw) at a temperature profile of 520°, 580°, 580°, 550° F. (rear to front). All the compositions contained Merlon M-40 resin (a homopolycarbonate based on bisphenol-A having a melt flow index of about 6.0 to 11.9 gm/10 min. per ASTM D-1238) and 4.0 phr of Acryloid KM 330 and 0.44 phr of a mold release agent having no criticality in the present invention. Test specimens were injection molded (4 oz., 60 sec. cycle; 650°, 650°, 600° F.) and the impact strength and splay formation determined as summarized below.

|   |   | Critical Thickness (mils) | ⅛″ Izod ft-lb/in | Appearance |
|---|---|---|---|---|
| A | Control | 259 | 12.23 | S |
| B | 0.1 phr Irganox 1076 | 245 | 11.55 | S |
| C | 0.2 phr Irganox 1076 | 245 | 11.96 | SS |
| D | 0.1 phr Irganox 1010 | 253 | 11.94 | SS |
| E | 0.2 phr Irganox 1010 | 253 | 11.84 | SS |
| F | 0.26 phr Irganox 1010 | 253 | 11.38 | SS |
| G | 0.1 phr Cyanox 1790 | >258 | 9.58 | SS |
| H | 0.2 phr Cyanox 1790 | 245 | 10.43 | SS |
| I | 0.26 phr Cyanox 1790 | 250 | 8.59 | SS |
| J | 0.1 phr Goodrite 3114 | 245 | 8.25 | HS |
| K | 0.2 phr Goodrite 3114 | 185 | 4.41 | HS |
| L | 0.26 phr Goodrite 3114 | 185 | 4.24 | HS |
| M | 0.1 phr Goodrite 3125 | >258 | 12.05 | NS |
| N | 0.2 phr Goodrite 3125 | 254 | 12.07 | NS |
| O | 0.26 phr Goodrite 3125 | 245 | 11.28 | NS |

Notes:
S — splay
SS — slight splay
HS — heavy splay
NS — no splay

Example 2

Compositions in accordance with the invention were prepared and their properties determined. The components (noted below) were dry blended prior to extrusion and then fed directly to an extruder (ZSK) 100–125 rpm, at a rate of 125 lbs/hr at a temperature profile of (rear to front) 290°, 273°, 292°, 320°, 305°, 294° C. Injection molding was carried out on a 4 oz. Newbury at an injection pressure of 900 psi and a secondary injection pressure of 700 psi and a temperature profile of 550°, 550°, 520° F.,

|  | A | Control |
|---|---|---|
| Polycarbonate, % | 95.7[1] | 95.4[3] |
| Impact modifier[2](%) | 4.3 | 4.6 |
| Stabilizer, phr[4] | 0.14[5] | 0.15[6] |
| Impact strength, Notched |  |  |
| Izod ft-lbs/in, ⅛" | 14.97 | 13.75 |
| ¼" | 12.66 | 10.93 |
| Critical thickness mils | >260 | >260 |
| Tensile Properties |  |  |
| Yield strength | 57.1 | 56.6 |
| Ultimate strength | 57.6 | 56.6 |
| Failure strength | 53.22 | 48.0 |
| Elongation at yield, % | 4-5 | 5 |
| Elongation at failure | 95-115 | 105-110 |

[1] a blend of Merlon M-39, a homopolycarbonate based on Bisphenol-A, melt index 15 gm/10 min, and Merlon M-40, a similar resin having a melt index of 9.9 gm/10 min (both are products of Mobay Chemical Corporation), at a weight ratio of 90/10.
[2] Acryloid KM-330.
[3] A blend of Merlon M-39 and Merlon M-40 at a weight ratio of about 85/15.
[4] the amount of the stabilizer is in parts per one hundred weight of polycarbonate plus impact modifier.
[5] Goodrite 3125
[6] Irganox 1076 (octadecyl-3,5-di-tert-4-hydroxyhydro-cinnamate) is described in U.S. Pat. Nos. 3,285,855 and 3,330,859.

The compositions above each contained about 0.42 phr of a release agent and about 0.5 phr of a pigment, both components having no criticality in the present invention.

The improvement associated with the compositions of the invention over prior art compositions—"control" above—employing a similar stabilizer was clearly indicated in that splay—i.e. silver streaking was completely absent from the compositions of the invention. Furthermore, as is evident upon the comparison below the compositions of the invention are far superior in terms of thermal aging. Test specimens of the respective compositions were aged at 105° C. and the effect of such thermal treatment on the impact properties was determined at the time intervals indicated below.

|  | ⅛" Izod impact strength ft-lb/in | | Critical thickness (mils) | |
|---|---|---|---|---|
|  | "A" | Control | "A" | Control |
| As molded | 15.0 | 13.8 | 260 | 260 |
| 21 days | 14.5 | 12.2 | 260 | 185 |
| 42 days | 14.8 | 9.1 | 245 | 135 |
| 60 days | 13.6 | 6.2 | 260 | 125 |

Although the invention has been described with reference to specific materials, the invention is only to be limited so far as is set forth in the accompanying claims.

What is claimed is:

1. A thermoplastic molding composition comprising a blend of an aromatic polycarbonate resin and an impact modifying amount of a compound containing an acrylate or a methacrylate functionality and characterized in that its glass transition temperature is below 20° C., said blend further containing an amount of a stabilizer conforming to

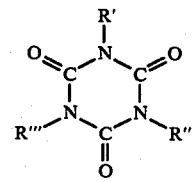

wherein R' is an alkylhydroxyphenyl carboalkoxy group having the formula

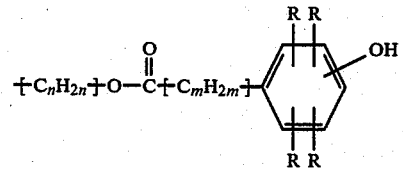

wherein n is an integer of from 1 to 12 and wherein m denotes an integer of from 0 to 8, R is a hydrogen atom or a $C_1$–$C_{12}$ hydrocarbon radical, R" and R'" are the same as R' or are a hydrogn atom or a $C_1$–$C_{20}$ hydrocarbon radical such as alkyl, cycloalkyl, aryl, alkaryl or a $C_1$–$C_{12}$ aralkyl, a hydroxyalkyl or a $C_2$–$C_{20}$ alkylcarboalkoxy group, said amount of a stabilizer being sufficient to substantially eliminate splay.

2. The composition of claim 1 wherein said blend contains about 80 to about 99 percent of said aromatic polycarbonate resin and about 1 to about 20 percent of said compound, said percentages being in relation to the weight of the blend.

3. The composition of claim 1 wherein said amount of said stabilizer is about 0.05 to about 0.5 phr, said phr being in relation to the weight of said blend.

4. The composition of claim 3 wherein said stabilizer conforms structurally to

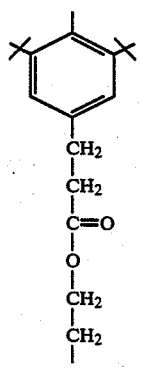

-continued

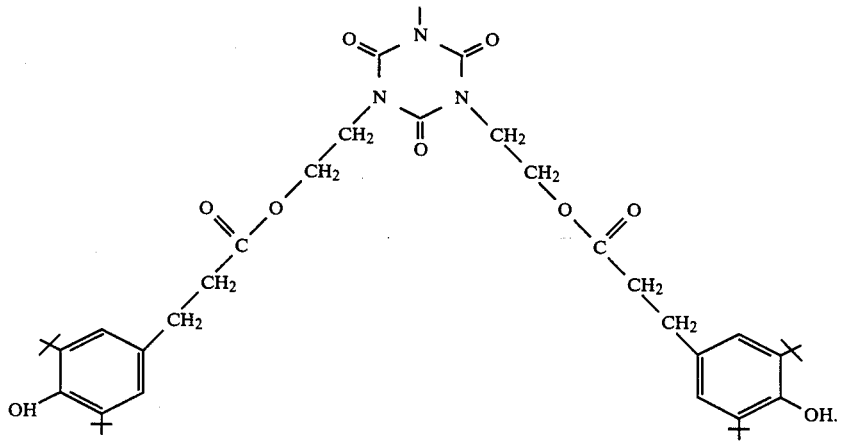

5. The composition of claim 1 wherein said compound is a multiple stage polymer comprising about 25 to 95 percent by weight of a first elastomeric phase and about 75 to 5 percent by weight of a second, rigid thermoplastic phase, said first elastomeric phase being polymerized from about 75 to 99.8 percent by weight of $C_1$–$C_6$ acrylate which is cross-linked with 0.1 to 5 percent by weight of a cross-linking monomer and to which is added 0.1 to 5 percent by weight of a graft linking monomer.

6. The composition of claim 5 wherein said acrylate is n-butyl acrylate.

7. The composition of claim 6 wherein said rigid thermoplastic phase is based on methyl methacrylate.

8. The composition of claim 7 wherein said n-butyl acrylate relates by weight to said cross-linking monomer and to said graft linking monomer and to said rigid thermoplastic phase as about 79.2/0.4/0.4/20.0 and wherein said cross-linking monomer is 1,3-butylene diacrylate and said graft linking monomer is diallyl maleate.

9. The composition of claim 8 wherein said blend contains about 80 to about 99 percent of said aromatic polycarbonate resin and about 1 to about 20 percent of said compound, said percentages being in relation to the weight of said blend, said composition further comprising about 0.05 to about 0.5 phr of said stabilizer, said phr being in relation to the weight of said blend.

* * * * *